(12) United States Patent
Wang et al.

(10) Patent No.: US 6,901,335 B2
(45) Date of Patent: May 31, 2005

(54) METHOD AND SYSTEM FOR ONLINE CONDITION MONITORING OF MULTISTAGE ROTARY MACHINERY

(75) Inventors: Wilson Wang, Waterloo (CA); Farid Golnaraghi, Waterloo (CA); Fathy Ismail, Waterloo (CA)

(73) Assignee: Mechworks Systems Inc., Waterloo (CA)

( * ) Notice: Subject to any disclaimer, the term of this patent is extended or adjusted under 35 U.S.C. 154(b) by 0 days.

(21) Appl. No.: 10/661,775

(22) Filed: Sep. 15, 2003

(65) Prior Publication Data

US 2004/0128083 A1 Jul. 1, 2004

Related U.S. Application Data (60) Provisional application No. 60/413,901, filed on Sep. 27, 2002.

(51) Int. Cl.[7] ............................................... G06F 19/00
(52) U.S. Cl. ......................................................... 702/35
(58) Field of Search ............................ 702/35; 700/122, 700/125; 358/526; 226/111; 382/167; 101/483, 484, 183, 247; 483/32; 318/569; 33/501; 188/267; 148/586; 15/77; 34/277; 324/158; 712/266

(56) References Cited

U.S. PATENT DOCUMENTS

| | | | |
|---|---|---|---|
| 4,297,788 A | * | 11/1981 | Sterki et al. ............... 33/501.9 |
| 4,528,630 A | | 7/1985 | Sargent |
| 4,724,763 A | | 2/1988 | Bolza-Schunemann et al. |
| 5,327,829 A | | 7/1994 | Miyoshi et al. |
| 5,357,858 A | | 10/1994 | Guaraldi et al. |
| 5,481,971 A | | 1/1996 | Grutzmacher et al. |
| 5,615,609 A | | 4/1997 | Hill et al. |
| 5,671,636 A | | 9/1997 | Gagne et al. |
| 5,674,169 A | * | 10/1997 | Yang ........................... 483/32 |
| 5,778,791 A | | 7/1998 | Albus et al. |
| 5,794,529 A | | 8/1998 | Dawley et al. |
| 5,813,335 A | | 9/1998 | Burke et al. |
| 5,865,120 A | | 2/1999 | Gross |
| 6,244,174 B1 | | 6/2001 | Sirowitzki et al. |

* cited by examiner

Primary Examiner—John Barlow
Assistant Examiner—Tung S Lau
(74) Attorney, Agent, or Firm—Joseph Conneely; Ogilvy Renault LLP (57) ABSTRACT

The present invention provides a method and system for online health condition monitoring of rotary machinery such as printing presses. The rotary machines have one or more stages and each stage has one or more rotary components. The method comprises the steps of: receiving one or more signals from sensors at each of the rotary units or bearing housings; generating an error matrix and diagnosing rotation synchronization errors among the different stages; generating error matrices using different signal processing techniques and diagnosing the health conditions of rotary components such as gears, bearings and shafts; and identifying the stages and rotary components having imperfections by comparing the current error matrices to stored reference error matrices. The present invention can also be used in other applications involving rotational components such as automobiles, airplanes, and power turbines to name a few.

15 Claims, 4 Drawing Sheets

METHOD AND SYSTEM FOR ONLINE CONDITION MONITORING OF MULTISTAGE ROTARY MACHINERY

This application claims priority from U.S. Provisional Patent Application Ser. No. 60/413,901 filed Sep. 27, 2002, the disclosure of which is incorporated herein by reference.

FIELD OF THE INVENTION

This invention relates to the field of diagnostic systems for rotary machines, and more specifically, to a method and system for diagnosing non-synchronization related imperfections, such as doubling, in multistage rotary machines such as printing presses.

BACKGROUND OF THE INVENTION

Doubling is a major quality control concern in the operation of multistage rotary machinery such as printing presses. Doubling is a register error among different printing units, which occurs whenever the impression on a printing cylinder blanket does not accurately line-up with the previous image remaining on the web. As the name suggests, doubling appears in a printed image as two impressions (i.e. the first on-register and the second off-register) causing the printed image to appear blurred, heavier, or fuller, than it should.

Doubling is typically caused by rotation non-synchronization of the printing cylinders among different units comprising the press. These rotation errors are induced by imperfections in the transmission systems within the units or the transmission links connecting different units. These imperfections may result from vibration, gear damage, bearing fault, excessive run-out, misalignment, or component wear.

For presses with web support rollers between units, imperfections or damage in roller bearings increase the roller rotation friction and induce variation in the web tension between different rollers. That web tension variation can cause doubling or smearing of the printed images, or even tear in the web.

Several methods have been proposed for detecting or preventing doubling problems in multistage rotary machinery such as printing presses. For example, U.S. Pat. No. 5,865,120 to Gross discloses a diagnostic system to determine the wear and damage of components in a printing press. The signals from different units are collected periodically and are processed using Fast Fourier Transform (FFT) techniques. The spectral components are correlated to each mechanical element of the press. By comparing the spectra with those of stored press-idiosyncratic reference signals, the changes between the two are applied for the diagnosis of the given rotary components. Deviations form a regular pattern may indicate an unhealthy pattern. If these deviations change over time and do not repeat, then they are considered to be the result of component wear or damage.

In U.S. Pat. No. 5,615,609 to Hill, et al., a system for controlling the registration of a multi-stage printing press for corrugated board materials is disclosed. Each printing unit has an AC drive motor, a controller, and a pulse signal generator. The controller is configured to receive the output pulses from a master encoder and follower encoders, process these output pulses to produce control commands, and transmit these control commands to the follower AC driving device so that the speeds of the follower AC motors are adjusted relative to the master AC motor to maintain rotation synchronization between the master and follower AC motors.

In U.S. Pat. No. 6,244,174 to Sirowitzki, et al., a diagnostic system for a sheet-fed offset printing machine is disclosed. A control system sets up a database recording the print jobs that are already completed. Then, a maintenance and inspection decision is made based on signals from different transducers in conjunction with recorded historic information in the database. For example, bearing wear level is detected with the help of temperature values from a temperature sensor placed in proximity to the bearing of interest, in conjunction with further production job information and recorded historic database information including printing material grade, type, number of colors to be printed, and printing pressure adjustments.

In U.S. Pat. No. 5,794,529 to Dawley, et al., a compliant drive system for printing presses is disclosed. This compliant drive system consists of a gear train and a circumferentially spaced spring coupling mechanism. The gear train meshes with the gears driving a plate cylinder, an ink vibrator and a water vibrator in a dampener, respectively. With the help of the spring coupling mechanism, the transmission of high frequency forces, vibrations and shocks from the ink and water vibrators, in the opposite direction, can be prevented. In this way, the occurrence of doubling problems is reduced.

Meshing inaccuracy of the gear train driving plate and blanket cylinders is one of the main causes of the doubling problem in printing presses. For example, U.S. Pat. No. 5,813,335 to Burke, et al. discloses an apparatus for preventing backlash between the gears driving the plate and blanket cylinders in a lithographic rotary printing press. This apparatus includes a supplementary gear, a support system, and a leaf spring assembly. The leaf spring assembly applies a force to the support element that biases the supplementary gear to make one gear in the gear train rotate in the opposite direction in order to offset the backlash between the gears driving the plate and blanket cylinders.

U.S. Pat. Nos. 5,671,636 and 5,357,858 to Gagne, et al. and Guaraldi, et al., respectively, disclose two types of systems for preventing circumferential separation when the gears driving the blanket and plate cylinders rotate at very high speeds. These systems consist of special torque transmitting gears and torsion springs. Torsional forces are applied to the corresponding gears in opposite rotational directions to keep the meshing teeth in contact.

Thus, the doubling problem is typically caused by rotational non-synchronization among the corresponding rotary components (e.g. cylinders and rollers) in different printing press units, in other words, among the gears driving these rotary components. One problem in detecting and preventing doubling is the difficulty in quantitatively determining rotational dissimilarities in real-time among the rotary components (e.g. gears) in different printing press units. A disadvantage of Gross, for example, is that it is difficult to detect gear damage using FFT techniques as spectral analysis usually fails to pick up the gear tooth faults. Since multistage rotary machines, such as printing presses, have complicated mechanical transmission systems, the spectra involved have too many spectral components to analyze effectively. Another disadvantage with existing systems is that they are not effective at determining gear run-out (which is related to factors such as bearing wear) or in using run-out information to diagnose doubling problems. Another disadvantage with existing systems such as that proposed by Hill, et al. is that if doubling is caused by factors such as vibration, it is difficult to offset the rotational non-synchronization among different units by the adjustment of the rotational speed of the driving motors in different units.

A further disadvantage of existing systems (e.g. those disclosed by Gagne, et al., Guaraldi, et al., and Burke, et al.) is that they focus their techniques mainly on the gears driving the plate and blank cylinders. In fact, a fault with any rotary component of the printing press' transmission system may cause a doubling problem.

A need therefore exists for an improved method and system for diagnosing doubling in multistage printing presses. Consequently, it is an object of the present invention to obviate or mitigate at least some of the above mentioned disadvantages.

SUMMARY OF THE INVENTION

According to one aspect of the invention, there is provided a method for diagnosing doubling in a multistage rotary machine, the rotary machine having one or more stages, each of the stages having one or more rotary components, the method comprising the steps of: receiving one or more signals from sensors at each of the rotary components; generating a current error matrix by comparing corresponding ones of the signals from each of the stages; and, comparing the current error matrix to at least one stored error matrix to identify one of the rotary components having a largest difference between the current and stored error matrices.

Preferably, the stored error matrix is a time-sequence of stored error matrices.

Preferably, the method further includes the step of comparing the current error matrix to a predetermined tolerance.

Preferably, the method further includes the step of, in response to the step of comparing the current error matrix to a predetermined tolerance, updating the stored error matrix with the current error matrix.

Preferably, the signals are digital signals.

Preferably, the method further includes the step of filtering the signals to reduce predetermined frequency components.

Preferably, the method further includes the step of filtering the current error matrix to reduce predetermined frequency components.

Preferably, the multistage rotary machine is a printing press, the stages are printing units, and the rotary components include gears and rollers.

Preferably, the gears and rollers are coupled to the casing of the machine with rotary support components including bearings.

Preferably, the current error matrix is a current rotation synchronization error matrix and the stored error matrix is a stored rotation synchronization error matrix.

Preferably, the signals include signals indicative of speed, position, tension, rotary momentum, and acceleration.

Preferably, the sensors include magnetic pickups, proximity probes, accelerometers, tensiometers, and rotary momentum detectors.

Advantageously, the present invention can diagnose doubling problems in multistage rotary machines such as printing machines in real-time in order to facilitate predictive maintenance and repairs. Another advantage of the invention is that it requires minimal hardware which can be readily installed.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "diagnostic system" is used herein to refer to any machine for processing data, including the computer systems and network arrangements described herein.

System. In general, the present invention provides a real-time diagnostic system for health condition monitoring of rotary machinery in order to facilitate predictive maintenance and repair. More particularly, the present invention provides a real-time diagnostic system for multistage rotary machinery such as printing presses to monitor rotation non-synchronization (i.e. doubling) at different stages, to isolate the sources of doubling problems, and to diagnose health problems of rotary components such as gear damage, run-out, and bearing faults. The diagnosis performed by the diagnostic system is based on signals acquired from sensors including accelerometers, magnetic pickups, and proximity probes installed on the rotary machinery. Advantageously, the diagnostic system can detect doubling in multistage printing presses. As mentioned, doubling is caused by rotation synchronization errors between different units comprising the multistage press.

The diagnosis may be applied to machines that are single or multi-staged. For multistage machines, the diagnosis is performed at two levels. At the first level, individual faulty units are identified or isolated. At the second level, the problematic rotary components are identified through the use of gear and bearing fault detection, run-out determination, and health condition propagation trend analysis. This second level diagnosis is also applicable to single unit machines. Advantageously, the diagnosis can be performed automatically on location or from remote locations via the Internet or any other means of data transmission. The present invention can also be used in other applications involving rotational components such as automobiles, airplanes, and power turbines to name a few.

The diagnostic system includes a number of software processing modules for tasks such as rotation error detection and rotary component health condition monitoring. The rotation error detection module includes filtering, signal analysis and comparison techniques. The rotary component fault health monitoring modules include modules for gear and bearing fault diagnosis, misalignment detection, and run-out detection. These modules employ various filtering processes and advanced signal processing techniques such as the wavelet transforms, kurtosis analysis, and short-time Fourier transforms.

Figure 1:
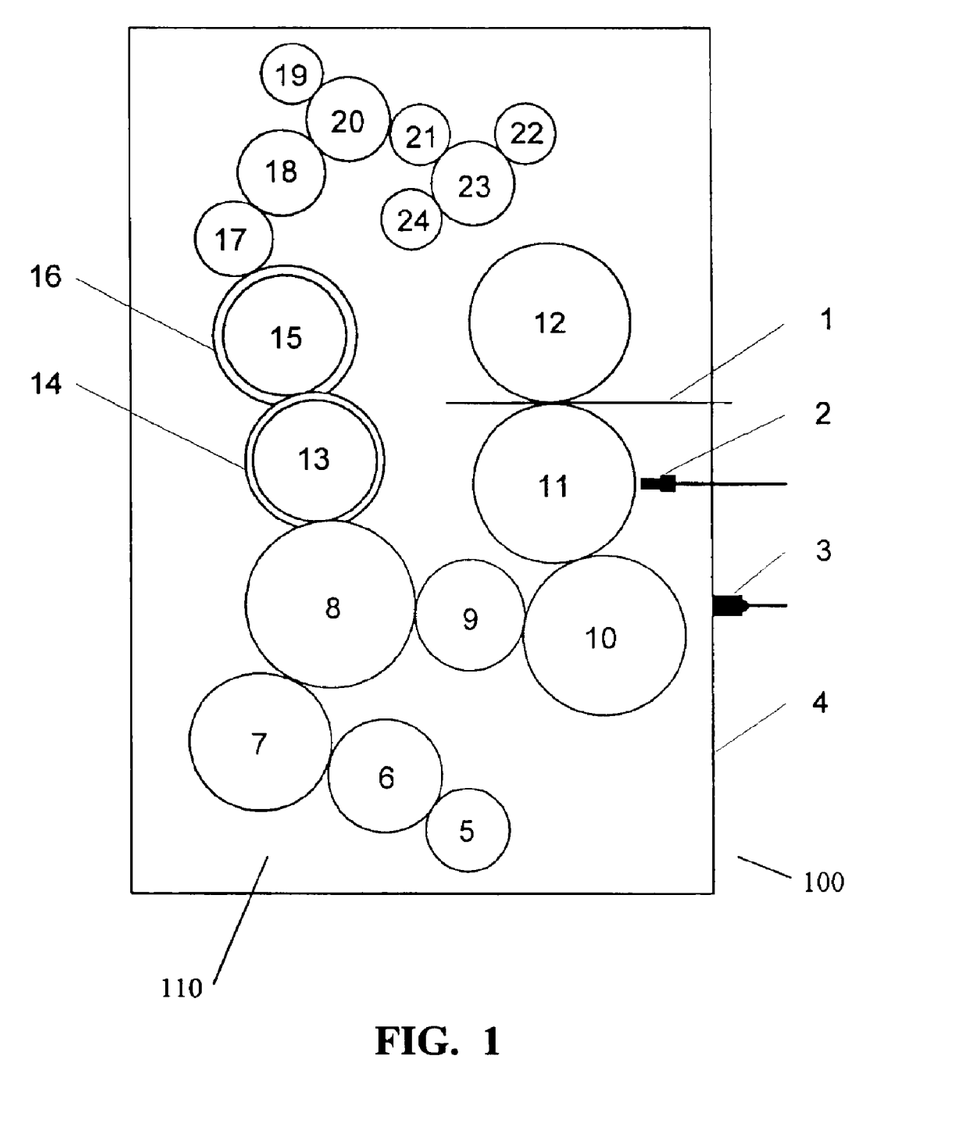
FIG. 1 is a side view schematic illustrating a printing unit in a multistage printing press in accordance with an embodiment of the invention.

FIG. 1 is a side view schematic illustrating a printing unit 100 in a multistage printing press in accordance with an embodiment of the invention. The printing unit 100 includes first sensors 2, second sensors 3, an enclosure 4 or frame, and a gear transmission system 110. The gear transmission system 110 includes a number of gears 5–24. In FIG. 1, a roll of paper or web 1 is fed through blanket and plate cylinders (not shown) driven by gears 11 and 12, respectively. In a typical printing press, a plate cylinder is a cylinder on which a plate is mounted. The plate bears a relief, planographic, or intaglio reproduction of type or cuts in metal, plastic, rubber or other material. A blanket cylinder is a cylinder on which a blanket is mounted. The blanket is typically a fabric-reinforced sheet of rubber used to transfer the reproduction from the plate onto the web 1. A multistage printing press typically includes a number of printing units 100 through which the web 1 passes sequentially.

The first and second sensors 2, 3 are used to generate signals indicative of speed, position, rotary momentum, tension, acceleration, etc., for components of the printing unit 100. The sensors 2, 3 may include magnetic pickups, proximity probes, accelerometers, tensiometers, rotary momentum detectors, custom sensors, etc. The first sensors 2 are mounted proximate the circumference of corresponding gears 11 in each printing unit 100. These sensors 2 are securely mounted in each printing unit 100 using screws, glue, wax, or powerful magnets. The gap between each sensor 2 and the gear circumference 11 is set to the required range specified for the sensor 2. The second sensors 3 are mounted to the enclosure 4 of each printing unit 100. These sensors 3 are also securely mounted to each printing unit 100 using screws, glue, wax, or powerful magnets. The first and second sensors 2, 3 may be used individually, simultaneously, or with other sensors, depending on the diagnostic process as will be described below. The first and second sensors 2, 3 may include multiple sensors of mixed type.

Figure 2:
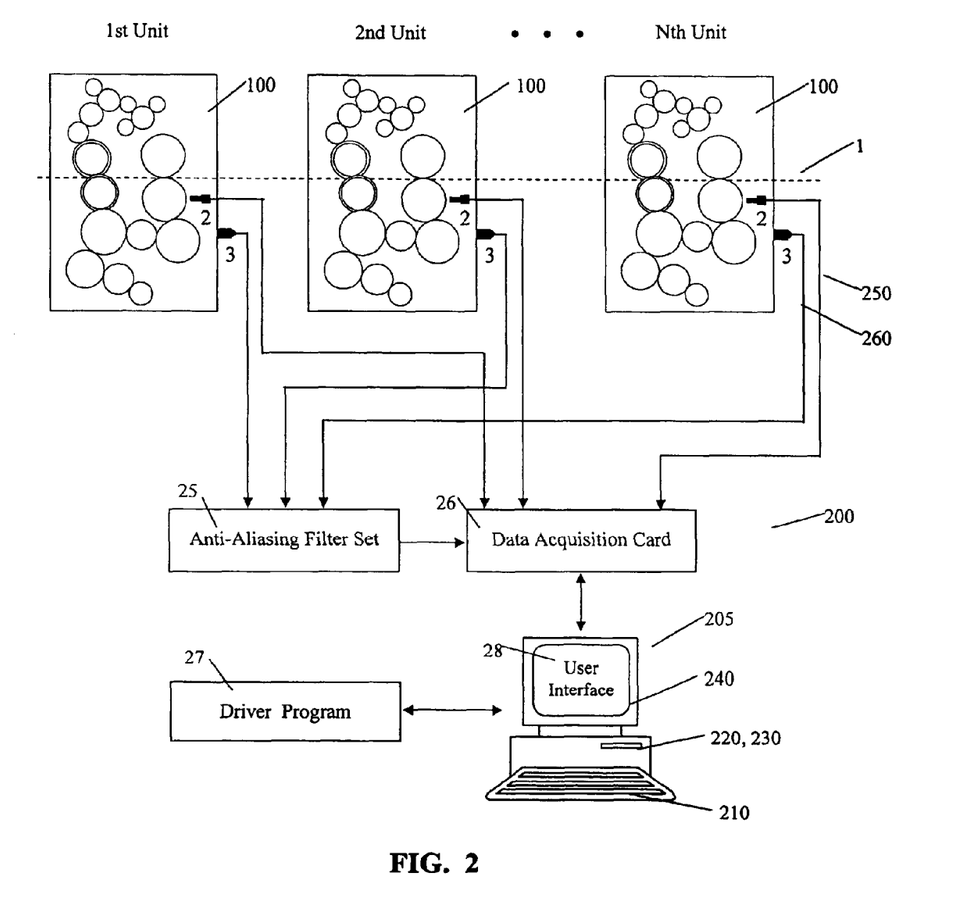
FIG. 2 is a block diagram illustrating a diagnostic system adapted to implement an embodiment of the invention.

FIG. 2 is a block diagram illustrating a diagnostic system 200 adapted to implement an embodiment of the invention. The diagnostic system 200 collects signals from the first and second sensors 2, 3 from each printing unit 100 and transfers these signals to a computer 205 for further processing. The diagnostic system 200 includes a data acquisition computer 205 having a user interface 28 and a driver program 27, an anti-aliasing filter set 25, a data acquisition card 26, first and second sensor 2, 3 coupled to at least one printing unit 100, and first and second communication links 250, 260. The first communication links 250 couple the first sensors 2 to the data acquisition card 26. The second communication links 260 couple the second sensors 3 to the anti-aliasing filter set 25 which is in turn coupled to the computer 205. The computer 205 includes an input device 210, a central processing unit or CPU 220, memory 230, and a display 240. The input device 210 may include a keyboard, mouse, trackball, or similar device. The CPU 220 may include dedicated coprocessors and memory devices. The memory 230 may include RAM, ROM, disk devices, and databases (including the knowledge database 39 shown in FIG. 3). And, the display 240 may include a computer screen, terminal device, or a hardcopy producing output device such as a printer or plotter. The diagnostic system 200 has stored therein software modules or data representing sequences of instructions which when executed cause the method described herein to be performed. Of course, the diagnostic system 200 may contain additional software and hardware a description of which is not necessary for understanding the invention.

The first and second communication links 250, 260 are used to transmit signals from the first and second sensors 2, 3 to the data acquisition card 26 directly or via the anti-aliasing filter set 25. The communication links 250, 260 may be wired links or wireless links (e.g. infrared ("IR"), radio frequency ("RF"), Bluetooth, etc.). When wired links are used, the lengths of each link are matched in order to maintain consistent cable effects in each signal channel.

The anti-aliasing filter set 25 is a hardware device that is used to filter out the higher frequency components in the collected signals from each sensor 3 in order to eliminate aliasing effects during further data processing. The types of filters used in the anti-aliasing filter set 25 are determined in accordance with factors including signal properties, applications, and phase distortion tolerance. The cut-off frequency of the channels of the anti-aliasing filter set 25 is determined according to signal processing requirements and the sampling frequency used.

The data acquisition card 26 is the hardware interface between the sensor signals and the computer 205. Typically, the data acquisition card 26 is mounted in a slot in the computer 205. It is used to digitize (i.e. convert from analog to digital format) analog signals from the sensors 2, 3 and transmit resultant digital signals to the computer 205 for further processing. The card 26 thus includes at least one analog-to-digital ("A/D") converter. A/D conversion is performed synchronously for all incoming analog signal channels in order to facilitate examination of signal characteristics from different units 100. In order to reduce signal transmission noise, amplitude modification devices may be used if the collected signal magnitudes are out of the optimal range of the data acquisition card 26. The system 200 may also use sensors 2 and/or 3 having built-in pre-processing and signal conditioning systems.

The driver program 27 is used to control data acquisition and diagnostic processes within the diagnostic system 200. The driver program 27 provides accommodation for different sensors 2, 3 and data acquisition cards 26. Typically, the driver program 27 supports the products of well-known sensor 2, 3 and card 26 manufacturers.

The driver program 27 determines the properties of the processing computer 205, such as CPU speed, available memory, and the programs currently running. The driver program 27 computes the current rotation speed of the gears or shafts of interest and presents the computed speed to a user through the user interface 28. The driver program 27 determines a sample number for each gear or shaft revolution according to a default value or according to a user selected sample number input by a user through the user interface 28. The driver program 27 determines a sampling frequency by multiplying the gear or shaft rotation speed and the sample number for each revolution. The driver program 27 determines a data sample size according to a default sample size related to the available computer memory 230 or according to a user selected sample size input through the user interface 28.

At the beginning of each data acquisition or diagnostic procedure, the use interface 28 presents the current speed of the gears or shafts of interest to the user. The user is then prompted to select the sample number during each revolution and the sample size to be collected. The user can also choose optimal default values. Next, the driver program 27 controls the data acquisition card 26 to digitize the signals from the sensors 2, 3 using a calculated sampling frequency. Signal data is collected until the data sample size is reached. After the data acquisition process is completed, the driver program 27 temporally saves the data and prompts the user to choose among diagnostic options including "Manual" and "Automatic", with "Automatic" being the default operation. The user can interrupt the data acquisition process at any time through the user interface 28.

Figure 3:
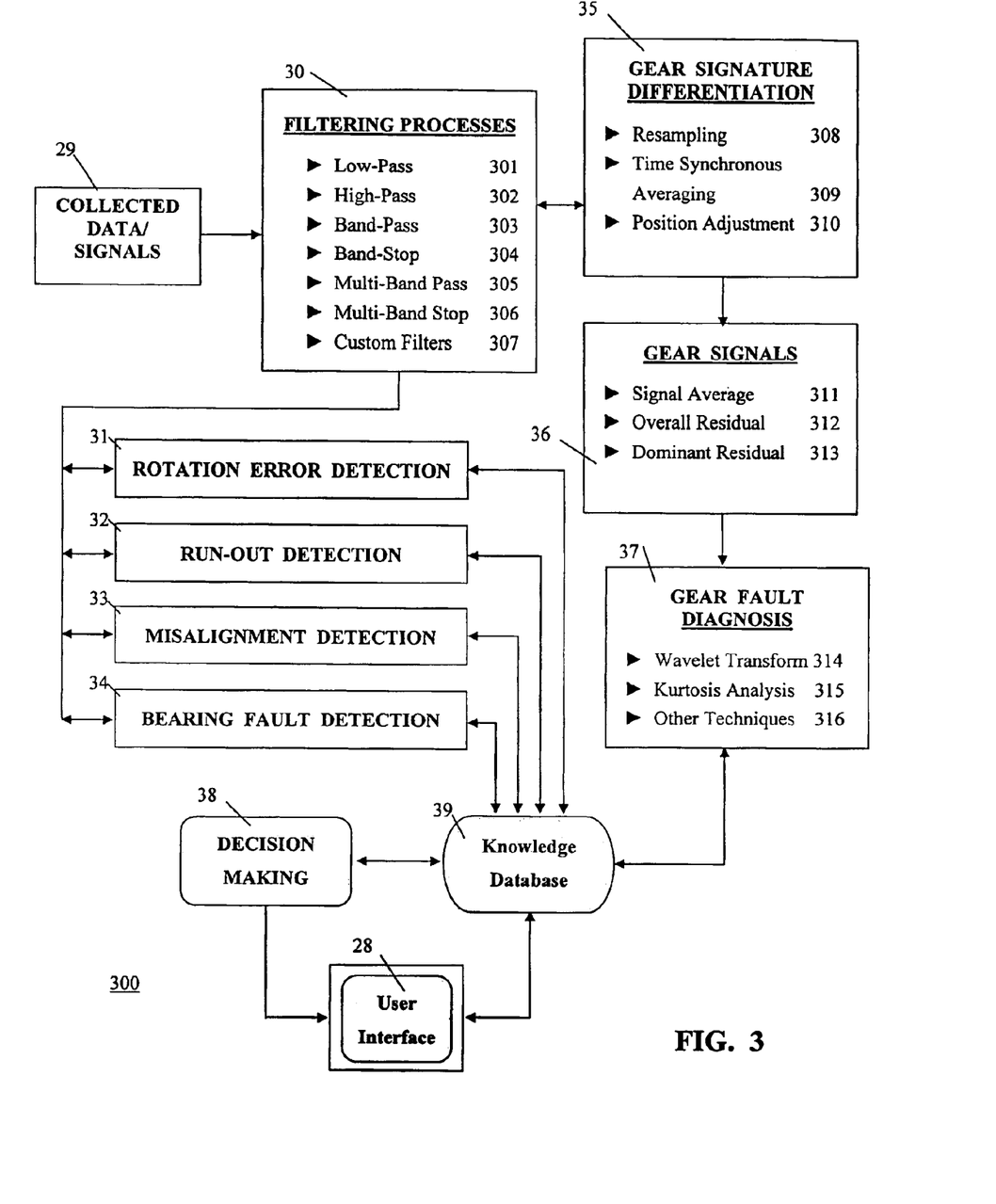
FIG. 3 is a flow diagram illustrating relationships between signal processing and diagnostic modules within the diagnostic system in accordance with an embodiment of the invention; and, FIG. 4 is a flow chart illustrating a method for diagnosing doubling in a multistage rotary machine in accordance with an embodiment of the invention.

FIG. 3 is a flow diagram 300 illustrating relationships between signal processing and diagnostic modules within the diagnostic system 200 in accordance with an embodiment of the invention. The diagnostic system 200 includes the following signal processing and diagnostic modules in its memory 220 and/or CPU 230: a filtering processes module 30, a rotation error detection module 31, a run-out detection module 32, a misalignment detection module 33, a bearing fault detection module 34, a gear signature differentiation module 35, a gear signals module 36, a gear fault diagnosis module 37, a decision making module 38, a knowledge database 39, a user interface module 28, and a driver program module 27. These modules operate on collected data 29 provided by the data acquisition card 26 under the control of the driver program module 27 and user interface module 28 as described above.

The filtering processes module 30 is used to filter the collected data/signals 29 from the data acquisition card 26 to eliminate noise, reduce the data size, and acquire the desired information from the signals, etc. The filtering processes module 30 includes various digital filtering processes such as a low-pass filter 301, a high-pass filter 302, a band-pass filter 303, a band-stop filter 304, a multi-band pass filter 305, a multi-band stop filter 306, and a tool for the user to set-up specific custom filters 307.

The low-pass filter 301 in the filtering processes module 30 is used to filter out the high-frequency components in a signal 29 and retain the signal's low-frequency components. The high-pass filter 302 is used to filter out the low-frequency components in a signal 29 and retain the signal's high-frequency components. The band-pass filter 303 is used to filter out frequency components outside a specific frequency band. The band-stop filter 304 is used to filter out frequency components within a specific frequency band. The multi-band pass filter 305 is used to filter out frequency components outside specific frequency bands. The multi-band stop filter 306 is used to filter out frequency components within specific frequency bands. Filter properties (e.g. filter type and filter order) and cut-off frequencies for these filters are determined using either default values or through user input via the user interface 28. Custom filters 307 are used to filter the signal according to the user specified filtering requirements. Filter properties and cut-off frequencies for the custom filters 307 are specified by the user through the user interface 28.

The filtering processes module 30 is coupled to each of the rotation error detection module 31, run-out detection module 32, the misalignment detection module 33, the bearing fault detection module 34, and the gear signature differentiation module 35.

The rotation error detection module 31 is used to determine rotation synchronization errors among the gears 5–24 in different units 100 of the printing press. The rotation error detection module 31 filters out the high-frequency components in the collected data 29 or signals using a low-pass filter 301 in the filtering processes module 30. The module 31 chooses a specific position in a tooth span for a gear 5–24 using interpolation and computes difference signals according to these tooth specific positions between all signals. The module 31 further filters these difference signals using a low-pass filter 301 in the filtering processes module 30. A quantitative value is computed by the rotation error detection module 31 by processing each resultant difference signature using techniques such as averaged peak-to-peak analysis or root mean squares. These quantitative values formulate a rotation synchronization error ("RSE") matrix. Each element in the RSE matrix represents the gear rotation synchronization error level between the corresponding units 100. This gear rotation synchronization analysis may be performed using data from one or more gear revolutions. Output from the rotation error detection module 31, including the RSE matrix, is coupled to the knowledge database 39.

The run-out detection module 32 is used to determine gear run-out caused by factors such as bearing wear. In general, gear run-out is a measure of the "out-of-round" of a gear's pitch circle diameter from tooth to tooth, either due to gear blank error or due to rotating around a centre that does not coincide with the centre of gear blank. The run-out detection module 32 computes an amplitude envelope signature by filtering out the high-frequency components in the signals 29 by using a low-pass filter 301 in the filtering processes module 30. The module 32 further filters out the obtained envelope signatures using a low-pass filter 301 in the filtering processes module 30. A quantitative value is computed by run-out detection module 32 by processing each resultant envelope signature using techniques such as averaged peak-to-peak analysis. These quantitative values formulate a run-out index ("RI") vector. Each element in the RI vector represents the run-out value of the gear 5–24 in the corresponding unit 100. If the signal is not a displacement signal, but rather a speed or acceleration signal, then the run-out detection module 32 uses an integral process to transform the obtained envelope signatures into corresponding displacement signatures. The gear run-out analysis may be performed using data from one or more gear revolutions. Output from the run-out detection module 32, including the RI vector, is coupled to the knowledge database 39.

The misalignment detection module 33 is used to determine the misalignment of a shaft system. Signals 29 from sensors including accelerometers are filtered using a low-pass filter 301 in the filtering processes module 30. The misalignment detection module 33 processes the filtered signal to determine misalignment levels using techniques such as Fourier spectrum analysis and phase analysis. The misalignment detection module 33 analyses signals and computes representative indicator values such as the ratio of the second shaft spectral harmonic to the first shaft spectral harmonic in the axial shaft direction, relative axial vibration levels, and the phase difference between shaft radial and axial vibrations. A comprehensive indicator value is calculated by integrating these indicator values using various techniques aided with weighting factors that are determined according to the application sensitivity of the various techniques. These values formulate a misalignment index ("MI") vector. Output from the misalignment detection module 33, including the MI vector, is coupled to the knowledge database 39.

The bearing fault detection module 34 is used to diagnose problems with or monitor the health condition of print unit bearings. Collected signals from various sensors, including accelerometers, are filtered using a filter set from the filtering processes module 30. The filter type and filter characteristics are determined according to the signal properties and the techniques adapted for diagnosis. For example, a high-pass filter 302 in the filtering processes module 30 is used to eliminate the lower frequency components. The filter cut-off frequency is determined so as to eliminate the frequency components from effects such as sensor mounting. A low-pass filter 301 in the filtering processes module 30 is used to eliminate the higher frequency components in the signal. The filter cut-off frequency is determined so as to filter out the frequency components higher than the fourth harmonic of the bearing characteristic frequency. The bearing fault detection module 34 processes the obtained filtered signal to detect health problems with bearing components including: the inner ring, the outer ring, and the rollers. This signal processing may include techniques such as the following: spectral analysis, Cepstrum analysis, kurtosis analysis, general time-domain analysis, amplitude demodulation, phase demodulation, high frequency resonant methods, short-time Fourier transform analysis, Wigner-Ville distribution analysis, discrete wavelet transforms, and continuous wavelet transforms. The module 34 further processes these results in order to make them compatible in either time or space scales. The module 34 produces a representative indicator value from each processing result related to the maximum amplitude. A comprehensive indicator value is calculated by integrating these indicator values using various techniques aided with weighting factors that are determined according to the application sensitivity of the various techniques. These values are used to establish a bearing fault ("BF") index vector. Each element in the BF index vector represents a fault indicator from a specific bearing fault detection technique and/or a fault indicator of the bearing of interest in the corresponding unit 100. Output from the bearing fault detection module 34, including the BF index vector, is coupled to the knowledge database 39.

The gear signature differentiation module 35 is used to differentiate the signature of a specific gear from a general collected signal and to represent it in one full-revolution. The gear signature differentiation module 35 includes the following signal processing modules or functions: resampling 308, time synchronous averaging 309, and position adjustment 310. In general, one tooth is chosen as a reference in each gear. In order to maintain identical samples per revolution and in order to eliminate the effects of gear rotation fluctuation, the module 35 interpolates gear data, revolution-by-revolution, to resample the data. In general, resampling allows for the maintenance of a constant sampling time interval between successive samples. The module 35 takes a time synchronous average over all of the signal records. The resultant gear signal is represented in exactly one revolution. In order to facilitate further signal processing, the gear signature differentiation module 35 then adjusts the starting position of the averaged signal in order to have that signal start from the beginning of a tooth meshing period. Output from the gear signature differentiation module 35 is coupled to the gear signals module 36.

The gear signals module 36 is used to further filter the obtained gear data to facilitate the advanced signal processing techniques performed by the gear fault diagnosis module 37, which will be described below. The gear signals module 36 includes modules or functions for producing the following: a signal average 311, an overall residual signal 312, and a dominant residual signal 313. The signal average 311 is the averaged gear signal produced using time synchronous averaging 309 in the gear signature differentiation module 35. The overall residual signal 312 is computed by filtering out the gear meshing frequency and its harmonics from the signal average 311 using a multi-band stop filter 306 in the filtering processes module 30. The dominant residual signal 313 is computed by filtering the signal average 311 using a band-pass filter 303 in the filtering processes module 30 around the gear dominant meshing frequency, then setting the spectral component corresponding to the dominant meshing frequency to zero. Output from the gear signals module 36 is coupled to the gear fault diagnosis module 37.

The gear fault diagnosis module 37 is used to diagnose problems with or monitor the health condition of a gear 110. Many signal processing techniques may be used in the gear fault diagnosis module 37 for detecting problems with the health of gears 5–24. The gear fault diagnosis module 37 includes the following modules or functions: wavelet transform 314, Kurtosis analysis 315, and other techniques 316. The wavelet transform module 314 is used to detect gear tooth faults in the time-frequency domain. The wavelet transform module 314 includes the following modules or functions: continuous wavelet transform amplitude analysis, continuous wavelet transform phase analysis, and discrete wavelet transform analysis. The "mother" wavelet and the processing bandwidth can be set as a default, or they can be selected by the user through the user interface 28. The kurtosis analysis module 315 performs signal processing to detect gear faults in the time-statistics domain. In general, kurtosis is an attribute of a distribution describing "peakedness". The kurtosis analysis module 315 includes the following modules or functions: tooth-based beta kurtosis analysis, revolution-based beta kurtosis analysis, and normal kurtosis analysis. The other techniques module 316 includes other types of signal processing methods to detect gear health problems. These methods may include the following: amplitude demodulation, phase demodulation, cepstrum analysis, spectrum analysis, short-time Fourier transforms, and Wigner-Ville distribution analysis. The module 37 further processes these results in order to make them compatible in either time or space scales. The module 37 produces a representative indicator value from each processing result related to the maximum amplitude. A comprehensive indicator value is calculated by integrating these indicator values using various techniques aided with weighting factors that are determined according to the application sensitivity of the various techniques. These representative values are used to establish a gear fault ("GF") index vector. Each element in the BF index vector represents a fault indicator from a specific gear fault detection technique and/or a fault indicator for the gear of interest in the corresponding unit 100. Output from the gear fault diagnosis module 37, including the GF index vector, is coupled to the knowledge database 39.

The knowledge database 39 receives and stores the RSE matrix from the rotation error detection module 31, the RI vector from the run-out detection module 32 for the gears of interest, the MI vector from the misalignment detection module 33, the BF index vector from the bearing fault detection module 34, and the GF index vector from the gear fault diagnosis module 37 for the gears of interest. The knowledge database 39 also stores various quality control tolerances for the multistage machine such as registration error limitations, doubling error tolerances, and run-out tolerances. The knowledge database 39 also stores historic processing records such as the RSE matrices RSEs for all units 100, the RI index vectors for all gears, the MI vectors for all shafts, the BF index vectors for all bearings, and the GR index vectors for all gears. Furthermore, the knowledge database 39 stores related information such as expert knowledge input by a user through the user interface 28, records of previous repairs to the machine, maintenance records, and print job set-up information. The knowledge database 39 is coupled to the decision making module 38 and to the user interface module 28.

The decision making module 38 determines the presence of a doubling problem by comparing the elements in the RSE matrix with doubling error tolerances, by analysing the distribution of the out of tolerance RSE elements in the RSE matrix, and by examining the historical trends of these out of tolerance RSE elements in the prior RSE matrices stored in the knowledge database 39. The decision making module 38 diagnoses the health condition of the gear of interest by comparing the elements in the GF index vector with gear health condition tolerances, and by examining the historical trends of these out of tolerance GF elements in the prior GF index vectors stored in the knowledge database 39. The decision making module 38 determines the run-out of the gear of interest by comparing the elements in the RI index vector with run-out error tolerances, and by examining the historical trends of these out of tolerance RI elements in the prior RI index vectors stored in the knowledge database 39. The decision making module 38 determines the presence of a misalignment of the shaft system of interest by comparing the elements in the MI index vector with misalignment error tolerances, and by examining the historical trends of these out of tolerance MI elements in the prior MI index vectors stored in the knowledge database 39. The decision making module 38 diagnoses problems in the bearing of interest by comparing the elements in the BF index vector with bearing health condition tolerances, and by examining the historical trends of these out of tolerance BF elements in the prior BF index vectors stored in the knowledge database 39. Finally, the decision making module 38 generates comprehensive diagnostic results in the form of an analysis summary with recommendations for presentation to a user through the user interface 28.

In operation, a diagnostic procedure is performed by the diagnostic system 200 as follows. Collected data (e.g. signals) 29 is low-pass filtered 310 in the filtering processes module 30 to eliminate the high-frequency components in the signal. Then the data set is fed to the rotation error detection module 31 where a RSE matrix is established for the gears 5–24 among different units 100. The RSE matrix is then stored in the knowledge database 39. Doubling error determination is performed by the decision making module 38 as follows. If the RSE matrix is within the predetermined tolerance, the decision making module 38 saves the last processed data set (i.e. typically for several shaft revolutions), signal average data, and the related machine operation information in the knowledge database 39. The present diagnostic procedure then ends and the system waits for another diagnostic task to be initiated by the driver program 27.

However, if the RSE matrix is outside the predetermined tolerance, then the decision making module 38 compares the current RSE matrix and its historic propagation trends as stored in the knowledge database 39 in order to identify which units 100 induce the largest rotation synchronization errors. Then, the run-out detection module 32 is triggered to compute the run-out values for the gears 5–24 of interest in each unit 100. Next, the misalignment detection module 33 is triggered to determine misalignments of the shaft systems; the bearing fault detection module 34 is triggered to determine the presence of problems with the bearings of interest in each unit; and, modules 35, 36, 37 are triggered to detect if the gears of interest in each unit have been damaged. Then, the decision making module 38 comprehensively analyses computed monitoring index vectors and the corresponding historic propagation trends, provides diagnostic results regarding the health condition of the gears and the corresponding bearing wear levels, and provides recommendations for repair and/or predictive maintenance, or, provides information with respect to further processing such as changing the sensor location to another gear in each unit.

The diagnostic procedure may be performed automatically, manually in conjunction with the user interface 28, locally at the printing press site, or remote from the printing press site via the Internet.

Advantageously, the present invention can diagnose doubling problems in multistage rotary machines such as printing machines in real-time in order to facilitate predictive maintenance and repairs. Another advantage of the invention is that it requires minimal hardware which can be readily installed.

Figure 4:
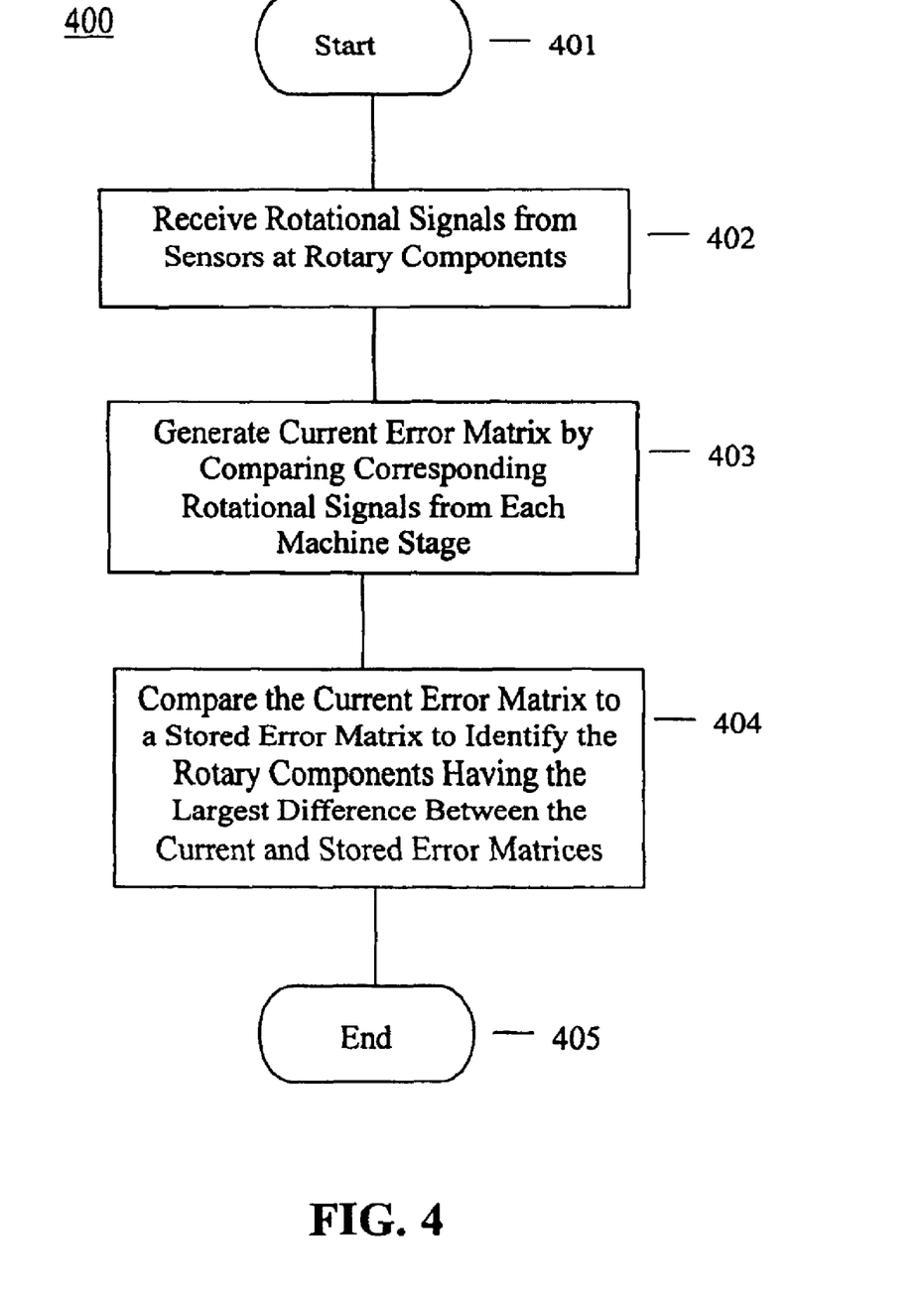

Method. FIG. 4 is a flow chart 400 illustrating a method for diagnosing doubling in a multistage rotary machine in accordance with an embodiment of the invention. The rotary machine has one or more stages or units 100, each of which has one or more rotary components 5–24. Preferably, the multistage rotary machine is a printing press, the stages are printing units, and the rotary components are gears.

At step 401, the method starts.

At step 402, one or more signals 29 are received from sensors 2, 3 at each of the rotary components 5–24. Preferably, the signals are digital signals. Preferably, the signals include signals indicative of speed, position, tension in web, rotary momentum, and acceleration. Preferably, the sensors include magnetic pickups, proximity probes, accelerometers, tensiometers, and rotary momentum detectors.

At step 403, a current error matrix is generated by comparing corresponding ones of the signals from each of the stages 100. Preferably, the stored error matrix is a time-sequence of stored error matrices. Preferably, this step may be preceded by a step of comparing the current error matrix to a predetermined tolerance. Preferably, in response to the step of comparing the current error matrix to a predetermined tolerance, a step of updating the stored error matrix with the current error matrix may be included. Preferably, the current error matrix is a current rotation synchronization error matrix and the stored error matrix is a stored rotation synchronization error matrix. Preferably, the method further includes the steps of filtering the signals to reduce predetermined frequency components and filtering the current error matrix to reduce predetermined frequency components.

At step 404, the current error matrix is compared to a stored error matrix to identify the rotary component that has the largest difference between the current and stored error matrices. In doing so, the cause of the doubling problem is diagnosed.

At step 405, the method ends.

Data Carrier Product. The sequences of instructions which when executed cause the method described herein to be performed by the diagnostic system of FIG. 2 can be contained in a data carrier product according to one embodiment of the invention. This data carrier product can be loaded into and run by the diagnostic system of FIG. 2.

Computer Software Product. The sequences of instructions which when executed cause the method described herein to be performed by the diagnostic system of FIG. 2 can be contained in a computer software product according to one embodiment of the invention. This computer software product can be loaded into and run by the diagnostic system of FIG. 2.

Integrated Circuit Product. The sequences of instructions which when executed cause the method described herein to be performed by the diagnostic system of FIG. 2 can be contained in an integrated circuit product including a coprocessor or memory according to one embodiment of the invention. This integrated circuit product can be installed in the diagnostic system of FIG. 2.

Although preferred embodiments of the invention have been described herein, it will be understood by those skilled in the art that variations may be made thereto without departing from the spirit of the invention or the scope of the appended claims.

The embodiments of the invention in which an exclusive property or privilege is claimed are defined as follows:

1. A method for diagnosing doubling in a printing press, said printing press having one or more stages, each of said stages having one or more rotary components, said method comprising the steps of:
   receiving one or more signals from sensors at each of said rotary components;
   generating a current error matrix by comparing corresponding ones of said signals from each of said stages; and,
   comparing said current error matrix to at least one stored error matrix to identify one of said rotary components having a largest difference between said current and stored error matrices.

2. The method of claim 1 wherein said stored error matrix is a time-sequence of stored error matrices.

3. The method of claim 2 and further comprising the step of comparing said current error matrix to a predetermined tolerance.

4. The method of claim 3 and further comprising the step of, in response to said step of comparing said current error matrix to a predetermined tolerance, updating said stored error matrix with said current error matrix.

5. The method of claim 1 wherein said signals are digital signals.

6. The method of claim 5 and further comprising the step of filtering said signals to reduce predetermined frequency components.

7. The method of claim 6 and further comprising the step of filtering said current error matrix to reduce predetermined frequency components.

8. The method of claim 1 wherein said stages are printing units.

9. The method of claim 8 wherein said rotary components include gears and rollers.

10. The method of claim 9 wherein said current error matrix is a current rotation synchronization error matrix and said stored error matrix is a stored rotation synchronization error matrix.

11. The method of claim 1 wherein said signals include signals indicative of speed, position, tension, rotary momentum, and acceleration.

12. The method of claim 1 wherein said sensors include magnetic pickups, proximity probes, accelerometers, tensiometers, and rotary momentum detectors.

13. A method for diagnosing doubling in a multistage rotary machine, said rotary machine having one or more stages, each of said stages having one or more rotary components, said method comprising the steps of:
   receiving one or more signals from sensors at each of said rotary components;
   generating a current error matrix by comparing corresponding ones of said signals from each of said stages;
   comparing said current error matrix to at least one stored error matrix to identify one of said rotary components having a largest difference between said current and stored error matrices;
   comparing said current error matrix to a predetermined tolerance; and,
   updating said stored error matrix with said current error matrix, wherein said stored error matrix is a time-sequence of stored error matrices.

14. A method for diagnosing doubling in a multistage rotary machine, said rotary machine having one or more stages, each of said stages having one or more rotary components, said method comprising the steps of:
   receiving one or more signals from sensors at each of said rotary components;
   generating a current error matrix by comparing corresponding ones of said signals from each of said stages; and,
   comparing said current error matrix to at least one stored error matrix to identify one of said rotary components having a largest difference between said current and stored error matrices; wherein said signals are at least one of speed, position, tension, rotary momentum, and acceleration signals.

15. A method for diagnosing doubling in a multistage rotary machine, said rotary machine having one or more stages, each of said stages having one or more rotary components, said method comprising the steps of:
   receiving one or more signals from sensors at each of said rotary components;
   generating a current error matrix by comparing corresponding ones of said signals from each of said stages; and,
   comparing said current error matrix to at least one stored error matrix to identify one of said rotary components having a largest difference between said current and stored error matrices; wherein said sensors are at least one of magnetic pickups, proximity probes, accelerometers, tensiometers, and rotary momentum detectors.

* * * * *